July 2, 1957 P. B. REEVES 2,797,590
ACTUATOR ASSEMBLY FOR SPEED-VARYING UNIT
Filed Oct. 30, 1952 3 Sheets-Sheet 3

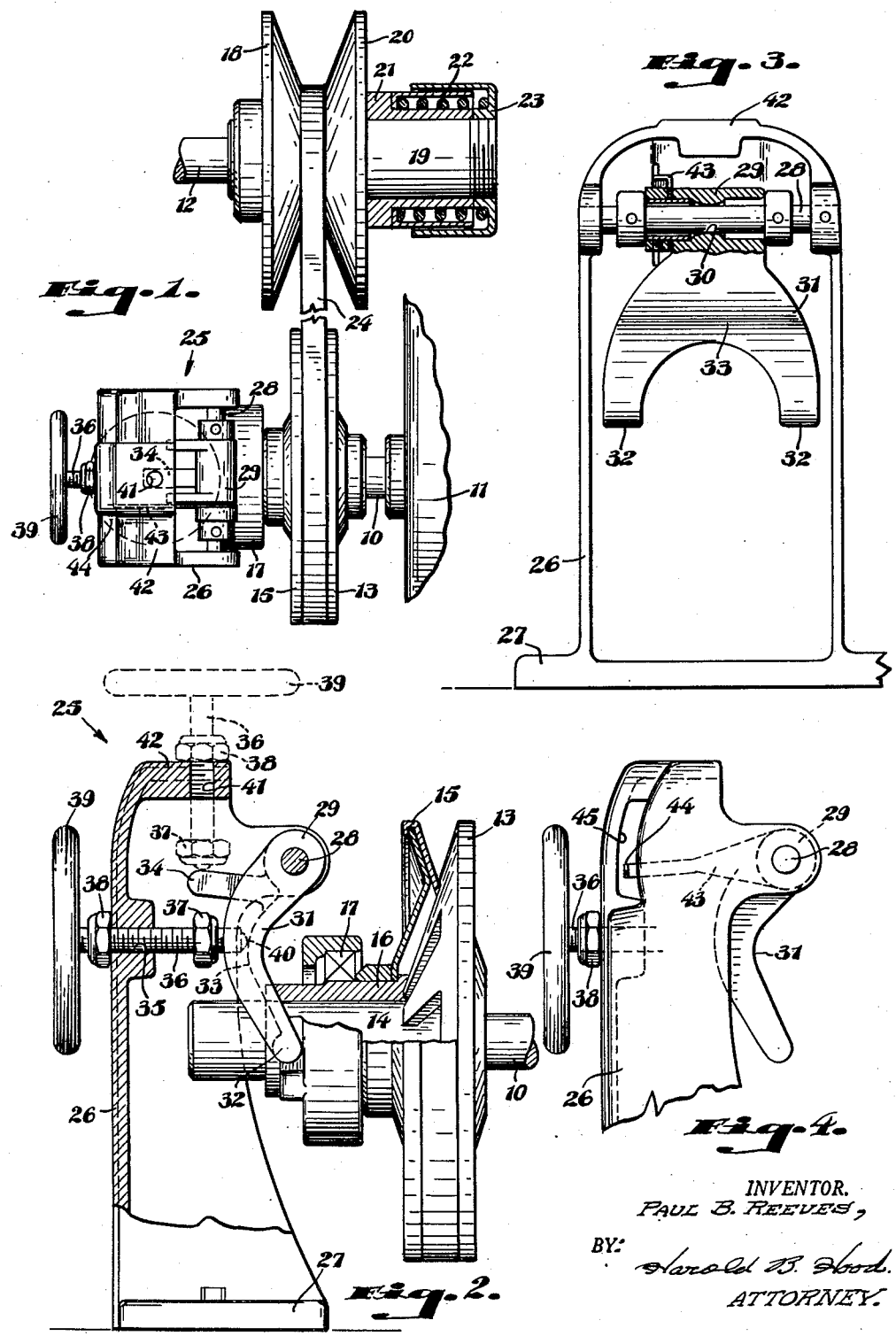

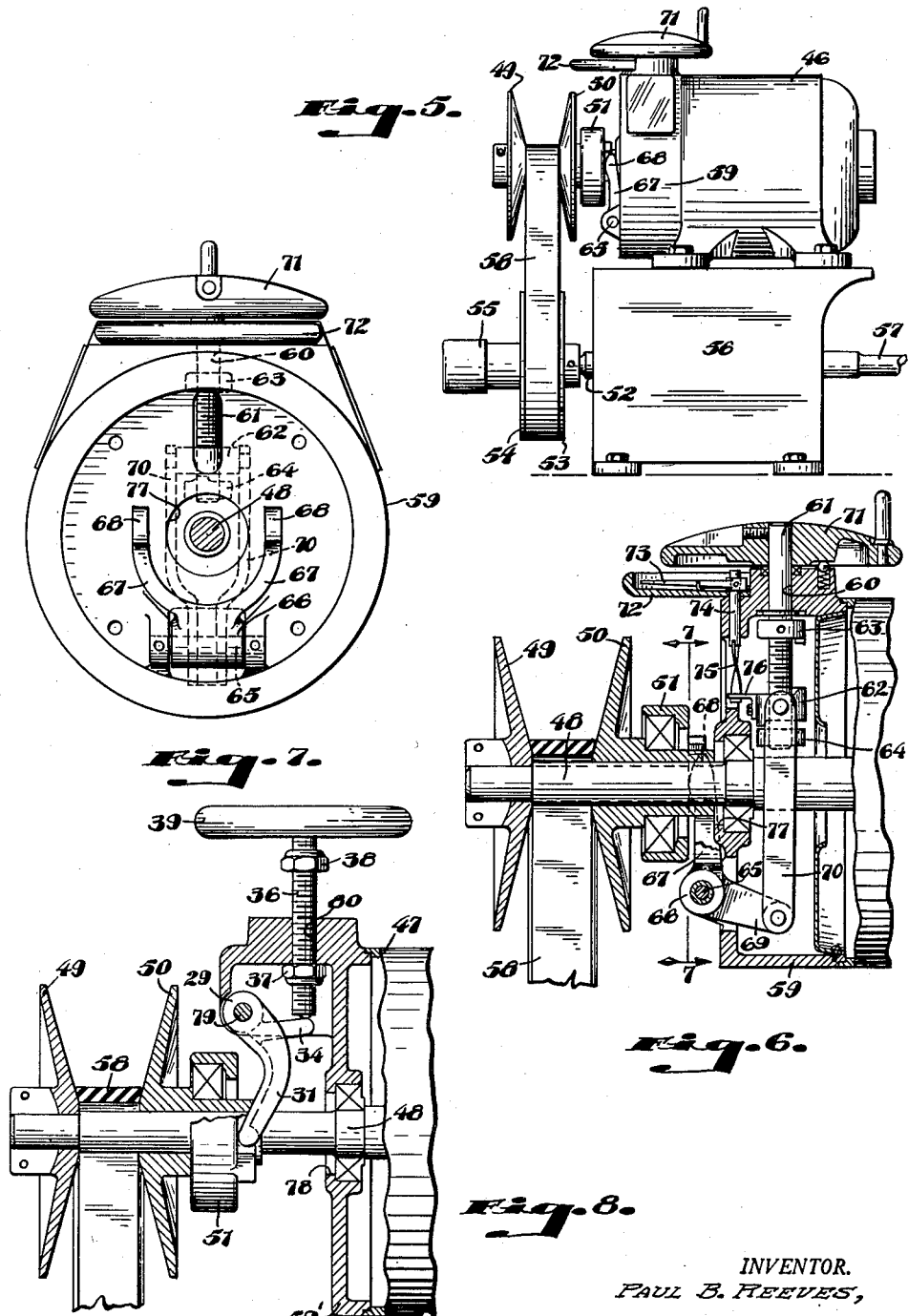

INVENTOR.
PAUL B. REEVES,
BY:
Harold B. Hood.
ATTORNEY.

United States Patent Office 2,797,590
Patented July 2, 1957

2,797,590

ACTUATOR ASSEMBLY FOR SPEED-VARYING UNIT

Paul B. Reeves, Columbus, Ind., assignor, by mesne assignments, to The Reliance Electric and Engineering Company, Cleveland, Ohio, a corporation of Ohio Application October 30, 1952, Serial No. 317,696

10 Claims. (Cl. 74—509)

The present invention relates to an actuator assembly for speed-varying units, and is particularly concerned with the provision of inexpensive and independent, or self-supporting, means for actuating the primary control element of a variable speed transmission. The invention is particularly concerned with actuator mechanism for use in connection with a speed-varying transmission of the type comprising an expansible V-pulley on one shaft and a resiliently expansible V-pulley on another shaft, one disc of each pulley being fixed to its shaft, together with an edge-active belt providing a driving connection between the pulleys; and the primary object of the invention is to provide an independent actuator mechanism which can be associated with such a transmission to actuate the shiftable disc of the first-named pulley.

In some plants, it is sometimes desirable to convert a machine originally constructed for constant speed operation, for variable speed operation. In some instances, such a conversion can be made by mounting an expansible V-pulley on the conventional driving shaft, mounting a resiliently expansible V-pulley on the input shaft of the machine, and connecting those pulleys through an edge-active belt. Means must be provided, in such a situation, for controlling the position of the shiftable disc of the expansible pulley, with relation to its mate; and circumstances such as the relative locations of the two shafts, the position of the machine to be driven in a building, the spacing between machines, and the like, sometimes are such as to make impossible the utilization of previously known devices for so controlling the position of that disc. Known devices for accomplishing the kind of conversion here under consideration usually comprise a frame or housing in which are journalled input and output shafts, respectively carrying expansible and resiliently expansible, belt-connected pulleys, together with actuating means supported in the housing; and it will be obvious that such units, being rigid in dimensions, cannot always be fitted into available spaces where conversion is desirable.

Further, conditions may make it necessary or desirable to arrange the manually- or power-actuated adjusting element on a vertical axis radial with respect to the power-input axis of the system to be controlled, or on an axis still radial to the power-input axis but horizontal or otherwise angularly inclined from the vertical; or conditions may require that the axis of the adjusting element be parallel with the system input axis but above, below, or otherwise offset with respect to such input axis.

The present invention, then, has as a primary object the provision of actuator means, comprising an independent, or self-supporting, assembly, which may be brought into cooperative association with conversion mechanism of maximum flexibility, such conversion mechanism comprising merely a pair of cooperating V-pulley units and a belt providing a driving connection therebetween, said pulley units being adapted for mounting upon shafts already present in the drive train to be converted. In a preferred embodiment of my invention, that flexibility includes provision for the location of the axis of the adjusting element in any of a large number of selective relations to the power-input axis of the system into which the actuator assembly may be introduced.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a plan view of a conversion system, installed between a motor and a machine to be driven, showing one form of actuator assembly constructed in accordance with the present invention;

Fig. 2 is an enlarged side elevation thereof, parts being broken away for clarity of illustration;

Fig. 3 is a front view of the actuator assembly, parts being shown in section;

Fig. 4 is a fragmentary side elevation of the assembly illustrated in Fig. 3;

Fig. 5 is a side elevation of a conversion train, showing a modified form of actuator assembly;

Fig. 6 is an enlarged fragmentary section through the actuator assembly and associated parts as shown in Fig. 5;

Fig. 7 is a section taken substantially on the line 7—7 of Fig. 6;

Fig. 8 is a view similar to Fig. 6 but showing a still further modified form of actuator assembly;

Figure 9:
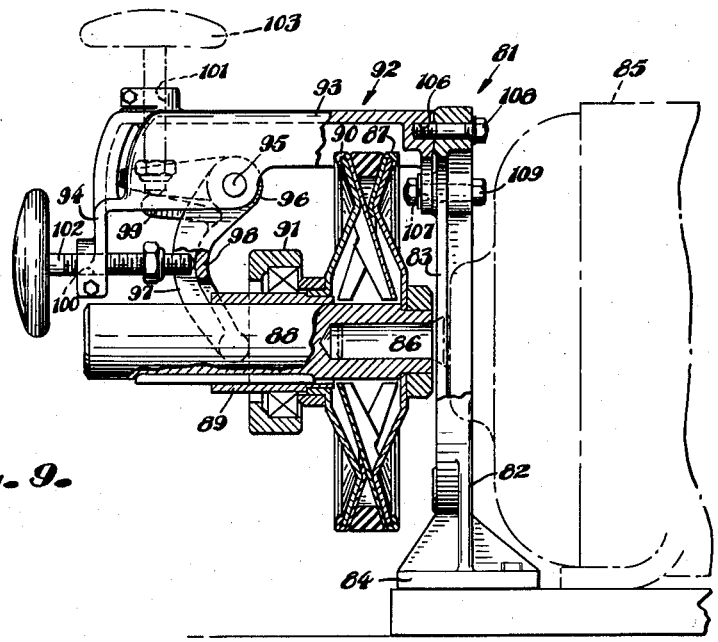
Fig. 9 is a view generally similar to Fig. 6 and showing a further, and presently preferred form of my invention.

Referring more particularly to the structure illustrated in Figs. 1 to 4, it will be seen that I have indicated a spindle 10 of an electric motor 11 which, however, may be considered the equivalent of any form of power-delivery shaft. I have shown also a power-receiving shaft 12 which may be the input shaft of any suitable machine which it is desired to drive at variable speeds. A coned disc 13 having an elongated hub 14 is fixed to the shaft 10; and a mating coned disc 15, having a hub 16 with which is associated a thrust bearing having a housing 17, is mounted for axial sliding movement upon the hub 14.

A similar disc 18, oppositely facing with respect to the disc 13, is fixed to the power-receiving shaft 12 and, in the illustrated embodiment of the assembly, is provided with an elongated hub 19 upon which is axially slidably mounted a mating disc 20 having a hub 21. A spring 22 is confined between an outwardly facing abutment on the hub 21, and a fixture 23 threadedly secured to the hub 19, said spring tending resiliently to urge the disc 20 toward the disc 18. An edge-active belt 24 provides a driving connection between the disc-pair 13—15 and the disc-pair 18—20. The manner in which adjustment of the disc 15 toward and away from the disc 13 results in opposite adjustment of the disc 20 relative to the disc 18, and so in variation in the velocity at which the shaft 12 will be driven, is so well understood in the art as to require no further explanation here.

As has been explained, the spindle 10 and the shaft 12 are conceived to be parts of a previously-existing drive train; and according to the present invention, an independent actuator assembly must be associated with the variable speed train comprising the pulley pairs 13, 15 and 18, 20, to provide manual control of the position of the disc 15 relative to the fixed disc 13. In the form of invention illustrated in Figs. 1 to 4, that actuator assembly is indicated generally by the reference numeral 25 and comprises a base 26 having a foot 27 through which said base may be secured in place in proper operative association with the disc 15.

The base supports a trunnion element 28, comprising pivot means, upon an axis which, when the assembly 25 is associated with the drive train, extends transversely with respect to the axis of the shaft 10. Supported on said pivot means for oscillation about the axis thereof is a block 29 carrying yoke means 31 provided with opposed arms 32, 32 arranged to straddle the axis of the shaft 10 and to engage the thrust bearing housing 17 at substantially diametrically opposite points. As shown, and preferably, the block 29 is formed with an annular convex surface 30 actually engaging the pivot means 28, whereby the block 29 may have a limited rocking movement relative to said pivot means to compensate for slight inaccuracies in the positioning of the base 26 with respect to the pulley.

The yoke 31 is provided with a web section 33 for a purpose to become apparent, and the block 29 is further formed with a pad 34 angularly related to the yoke 31, likewise for a purpose to become apparent.

The rear wall of the base 26 is formed with a threaded bore 35 disposed on an axis transverse with respect to the axis of the pivot means 28 and lying, when the base is operatively associated with the drive train, in a common plane with the axis of the shaft 10. A screw shaft 36 is threadedly received in the bore 35 and adjustably carries stop nuts 37 and 38, as is clearly shown in Fig. 2. A hand wheel 39 is carried on the screw shaft 36 outside the base; and said shaft is preferably provided with a domed tip 40 coactively engaging the web portion 33 of the yoke 31.

It will be clear that, as the screw shaft is rotated in one direction, said shaft will be moved axially toward the fixed disc 13, thereby to swing the block 29 and yoke 31 in a counter-clockwise direction to shift the disc 15 positively toward the disc 13. Such movement of the disc 15 will, of course, pull the belt 24 more deeply into the groove between the discs 18 and 20, thereby forcing the disc 20 away from the disc 18, against the tendency of the spring 22. If the screw shaft is rotated in the opposite direction, to shift the same toward the left as viewed in Fig. 1, the spring 22 will be permitted to force the disc 20 toward the disc 18, thereby squeezing the belt outwardly between said discs and pulling the same more deeply into the groove between discs 13 and 15 to cause the disc 15 to follow such movement of the shaft 36.

There are situations in which, because of machine location and/or clearance between adjacent machines, there is no room for manipulation of the hand wheel 39 in its solid-line illustrated position. Therefore, I prefer to form a further threaded bore 41 in the top wall 42 of the base 26 for alternative reception of the screw shaft 36, in the manner illustrated in dotted lines in Fig. 2. The bore 41 is located upon an axis transverse with respect to the axis of the pivot means 28, and in a plane including the axis of the shaft 10 and in a position to intersect the pad 34. Thus, when the shaft 36 is mounted in the bore 41, its domed tip will operatively engage the pad 34 so that, as the screw shaft is rotated in the direction to move the same inwardly with respect to the base, the block 29 and yoke 31 will, again, be turned in a counter-clockwise direction.

If desired, an indicator arm 43 may be mounted to turn with the block 29, as illustrated in Figs. 3 and 4, the base being formed with a slot 45 through which may project a finger 44 for indicating cooperation with a scale, not shown, on an external surface of the base.

An alternative form of actuator assembly is illustrated in Figs. 5 to 7. In these views, I have shown an electric motor 46 having a frame 47 provided with an annular flange at one end, the spindle 48 projecting a substantial distance beyond said flange. In this arrangement, a coned disc 49 is fixedly mounted on the distal extremity of the spindle 48; and a mating disc 50 is mounted for axial sliding movement toward and away from the disc 49, between said disc and the motor frame end. A thrust bearing 51 is preferably interposed between the disc 50 and the motor.

A power-receiving shaft 52 carries a fixed disc 53 and a shiftable disc 54 resiliently urged, by means indicated at 55, toward the disc 53. As shown, the shaft 52 constitutes the input shaft of a reduction gear, indicated by the reference numeral 56, whose output shaft 57 may be connected to any suitable machine to be driven. An edge-active belt provides a driving connection between the cone pair 49, 50 and the cone pair 53, 54.

In these views, the actuator assembly comprises a base 59 ported as at 77 for the accommodation of the spindle 48. The base 59 is generally annular and is formed and arranged to be mounted on and secured to the end flange of the motor frame 47. As shown, the base 59 is formed with a bore 60 whose axis lies in a plane including the axis of the shaft 48; and a screw shaft 61 is journalled in said bore, means being provided to hold said shaft against axial movement relative to the base. A nut 62 is threadedly mounted upon said shaft 61, and stops 63 and 64 are adjustably supported on said shaft at opposite sides of said nut.

A trunnion 65 comprising pivot means is carried by the base 59 upon an axis transverse to the axis of the shaft 61 and transverse to the axis of the spindle 48. A block 66 is supported upon said pivot means 65 for oscillation about the axis of the latter; and said block carries yoke means 67, having arms 68, 68 which, when the base is in position on the motor, straddle the axis of the spindle 48 for cooperative engagement with the thrust bearing housing 51 at diametrically opposed points. Preferably, the block 66 will be mounted on the pivot means 65 substantially in the same manner in which the block 29 is mounted on the pivot means 28.

The block 66 is provided with a further arm 69, angularly related to the yoke means 67; and links 70, 70 are pivoted to said arm 69 and to the nut 62. Obviously, the links 70 provide an operative connection between the nut 62 and the block arm 69 and, at the same time, hold said nut against rotation.

A hand wheel 71 is carried on the shaft 61 outside the base 59. Preferably, the base will carry a pan 72 formed to provide an indicating scale, and an indicator finger 73 will be mounted upon a spindle 74 suitably journalled in the base, to sweep that scale, means indicated at 75 and 76 being provided to turn the spindle 74 in response to axial movement of the nut 62.

In Fig. 8 I have illustrated a form of actuator assembly combining the features of the form illustrated in Figs. 1 to 4 with some of the features of the form illustrated in Figs. 5 to 7. Thus, a base 59', similar in many respects to the base 59, is carried on the end flange of the motor frame 47 and is ported, as at 78, to accommodate the motor spindle 48. The base 59' carries pivot means 79 similar to the pivot means 28, and the block 29, with its yoke means 31 and pad 34, is mounted on said pivot means 79. A threaded bore 80, similar to the bore 41, is formed in the base 59', and the screw shaft 36, with its stop nuts 37 and 38, is threadedly mounted in said bore 80 for cooperative engagement with the pad 34. The actuator assembly is thus positioned between the motor frame and the thrust bearing 51 cooperatively engaging the shiftable pulley 50 which is movable toward and away from the fixed pulley 49. Manipulation of the screw shaft 36 through its hand wheel 39 acts on the disc 50 precisely in the manner in which manipulation of the screw shaft 36 acts upon the disc 15 when said screw shaft is mounted in the bore 41.

Figure 10:
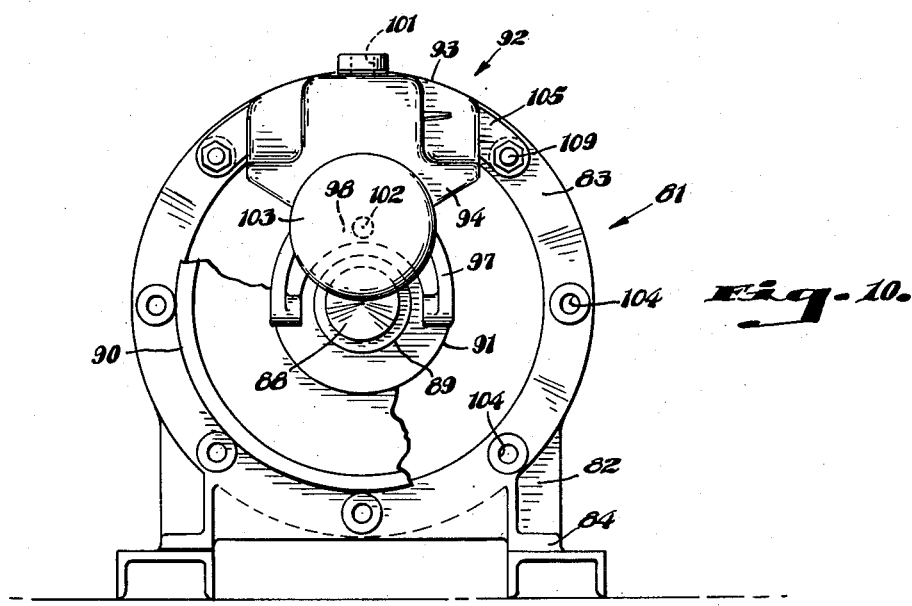
Fig. 10 is an end elevation of the form of actuator assembly shown in Fig. 9.

A still further form of my invention, which I presently prefer because it appears to be still more flexible in its application to the problem, is illustrated in Figs. 9 and 10. In this form of the invention, a base, indicated generally by the reference numeral 81, comprises a standard 82, consisting essentially of an annular plate 83 supported upon foot 84, and an arm, indicated generally by the reference numeral 92, and adapted to be removably secured to the standard 82. In use, the standard 82 is adapted to be mounted, by means of lag screws or the like passing through suitable openings in the foot 84, closely adjacent the source of power, with its plate 83 concentric with the power delivery shaft. As illustrated, the actuator assembly is associated with an electric motor comprising a frame 85 and a spindle 86 projecting from one end of said frame. A coned disc 87, having an axially-elongated hub 88, is suitably fixed to the spindle 86, and the hub 89 of a mating coned disc is keyed to the hub 88 for axial adjustment therealong toward and away from the disc 87. A thrust bearing having a housing 91 is operatively mounted on the hub 89.

In the illustrated embodiment of the invention, the standard 82 is arranged closely adjacent the end of the motor frame 85 with its plate 83 substantially concentric with the spindle 86. The arm 92 comprises a portion 93 which, when the arm is mounted on the standard 82, projects from said standard in a direction substantially parallel with the axis of the spindle 86 and to a point beyond the outermost position of the bearing housing 91; and a portion 94, carried at the distal end of the portion 93, and projecting radially toward the axis of the spindle 86. The arm portion 93 supports a trunnion element 95 upon an axis transverse with respect to the axis of the spindle 86; and a block 96 is supported upon said trunnion element for oscillation about the axis of the trunnion element; and yoke means 97 projects from said block to straddle the hub 88 and to engage the outer face of the bearing housing 91 on opposite sides of said axis. Preferably, the block 96 will be mounted on the trunnion means 95 in the manner above disclosed in Fig. 3.

The yoke means includes, intermediate its ends, a web portion 98 similar to the web portion 33 of Fig. 2; and the block 96 is provided with a pad 99 similar to the pad 34 of Fig. 2.

A threaded bore 100 is provided in the portion 94 of the arm 92, parallel with the axis of the spindle 86 and arranged with its axis intersecting the web portion 98 of the yoke 97; and the portion 93 of the arm is provided with a threaded bore 101 on an axis intersecting the pad 99. A screw shaft 102 may be selectively mounted in the bore 100 or in the bore 101, and said screw shaft may carry a hand wheel 103. It will be obvious that the screw shaft will cooperate with the web portion 98 or the pad 99 in the manner in which the screw shaft 36 cooperates with the web portion 33 or the pad 34.

The standard 82 is formed to provide an annular series of stations at any one of which the arm 92 may be secured to said standard. As shown, the plate 83 is formed with a series of equi-angularly spaced bores 104, and the arm 92 is formed with a peripherally extended foot 105 provided with a central, tapped socket 106 and with perforations 107 adjacent its opposite ends. The perforations 107 are oppositely and equiangularly spaced from the socket 106 to an extent equal to the spacing between the bores 104. The arm 92 may be secured in place on the plate 83 and any point at which the socket 106 registers with one of the bores 104 and the perforations 107 register with the oppositely adjacent bores 104. In any position of the arm 92, the arm portion 93 will be substantially parallel with the axis of the spindle 86, while the arm portion 94 will extend radially toward said axis.

I claim as my invention:

1. An actuator assembly for an element axially shiftably supported from a shaft, comprising a base, pivot means supported from said base, a block supported from said pivot means for oscillation about the axis of said pivot means, yoke means projecting from said block, a pad on said block and projecting therefrom in angular relation to said yoke means, said base being formed with two bores on angularly related axes, the axis of one of said bores intersecting said yoke means, the axis of the other of said bores intersecting said pad, screw shaft means mountable in said bores and including a member movable in the axial line of said screw shaft means upon rotation thereof, and means for removably securing said base in position, with respect to such a shaft, with said pivot means transverse relative to the shaft axis and said yoke means operatively associated with the shiftable element.

2. An actuator assembly for an element axially shiftably supported from a shaft, comprising a base, pivot means supported from said base, yoke means supported from said pivot means for oscillation about the axis of said pivot means and including a shank portion and a pair of separated furcations, said base being formed with a threaded bore on an axis transverse relative to the axis of said pivot means, said bore axis intersecting said yoke means shank portion between said pivot means and said furcations, a screw shaft threadedly mounted in said bore and engageable with said yoke means shank portion, and means for removably securing said base in position, with respect to such a shaft, with said pivot means transverse relative to the shaft axis and said yoke means furcations straddling such shaft and operatively associated with the shiftable element.

3. An actuator assembly for an element axially shiftably supported from a shaft, comprising a base, means for locating said base in cooperative association with such a shaft and element, pivot means supported from said base upon an axis which, when said base is so located, is transverse with respect to the axis of such shaft, yoke means supported from said pivot means for oscillation about the axis of said pivot means, said yoke means including portions engageable with such shiftable element at points on opposite sides of the axis of such shaft, and said yoke means further having a pad angularly related to said yoke portions, said base being formed with a threaded bore whose axis is transverse with respect to the axis of said pivot means and intersects said pad, and a screw shaft threadedly mounted in said bore and engageable with said pad to force said yoke portions to move in the direction toward such element.

4. An actuator assembly for an element axially shiftably supported from a shaft, comprising a base having an opening therethrough and formed to provide a substantially annular flange at one end of said opening, screw shaft means mounted in said base upon an axis traversing said opening and including means movable along said axis, pivot means supported from said base on an axis transverse with respect to the axis of said screw shaft means, and yoke means supported for oscillation about the axis of said pivot means and having a portion which, when said base is supported with its flange concentrically circumscribing such a shaft, is disposed in cooperative engagement with such shiftable element, said means movable along the axis of said screw shaft means being operatively associated with said yoke means to shift the latter in response to rotation of said screw shaft means.

5. An actuator assembly for an element axially shiftably supported from a shaft, comprising a base having an opening therethrough and formed to provide a substantially annular flange at one end of said opening, a screw shaft journalled in said base upon an axis traversing said opening, said shaft being held against axial movement relative to said base, a nut threadedly mounted on said screw shaft, pivot means supported from said base on an axis transverse with respect to the axis of said screw shaft, yoke means supported for oscillation about the axis of said pivot means and having a portion which, when said base is supported with its flange concentrically circumscribing such a shaft, is disposed in cooperative engagement with such shiftable element, and link means providing an operative connection between said nut and said yoke means.

6. An actuator assembly for an element axially shiftably supported from a shaft, comprising a base including a standard, means for removably mounting said standard adjacent such a shaft, an arm supported from said standard and projecting therefrom, when said standard is so mounted, in substantially parallel, adjacent relation to a portion of such shaft to overlie the element supported from the shaft, pivot means supported from said arm, a block supported from said pivot means for oscillation about the axis of said pivot means, yoke means projecting from said block and arranged, when said standard is so mounted, to straddle such a shaft for coactive association with such shiftable element, a pad on said block and projecting therefrom in angular relation to said yoke means, said arm being formed with two threaded bores on angularly related axes, the axis of one of said bores intersecting said yoke means and the axis of the other of said bores intersecting said pad, and screw shaft means threadedly mountable for axial movement in said bores to shift said block and yoke means.

7. An actuator assembly for an element axially shiftably supported from a shaft, comprising a base including a standard formed to provide an annular plate, means for removably mounting said standard adjacent such a shaft with said plate substantially concentric therewith, an arm supported from said standard and projecting therefrom, when said standard is so mounted, in substantially parallel, adjacent relation to a portion of such shaft to overlie the element supported from the shaft, threaded means supported from said arm for movement relative thereto substantially in an axial line, pivot means supported from said arm upon an axis transverse with respect to said axial line, a block supported from said pivot means for oscillation about the axis of said pivot means, yoke means projecting from said block and arranged, when said standard is so mounted, to straddle such a shaft for coactive association with such shiftable element, said screw means coacting with said block to shift the same positively in at least one direction about said pivot means axis when said screw means moves relative to said arm, and means for securing said arm adjustably to said standard at any one of a plurality of peripherally spaced positions relative to said standard, comprising a plurality of identical securing stations peripherally spaced about said plate, and means engageable with said arm and with certain of said securing stations to fix said arm to said plate.

8. An actuator assembly for an element axially shiftably supported from a shaft, comprising a base including a standard formed to provide an annular plate, means for removably mounting said standard adjacent such a shaft with said plate substantially concentric therewith, an arm supported from said standard and having a first portion which, when said standard is so mounted, projects from said standard in substantially parallel, adjacent relation to a portion of such shaft to overlie the element supported from the shaft, and having a second portion at the distal end of said first portion which extends radially toward the axis of said plate, threaded means supported from said arm for movement relative thereto substantially in an axial line, pivot means supported from said arm upon an axis transverse with respect to said axial line, yoke means supported for oscillation about the axis of said pivot means and having a portion disposed, when said standard is so mounted, in cooperative association with such shiftable element, and said yoke means further including a portion disposed for actuation by said threaded means, and means for securing said arm adjustably to said standard at any one of a plurality of peripherally spaced positions relative to said standard, comprising a plurality of identical securing stations peripherally spaced about said plate, and means engageable with said arm and with certain of said securing stations to fix said arm to said plate.

9. An actuator assembly for an element axially shiftably supported from a shaft, comprising a base including a standard formed to provide an annular plate, means for removably mounting said standard adjacent such a shaft with said plate substantially concentric therewith, an arm supported from said standard and having a first portion which, when said standard is so mounted, projects from said standard in substantially parallel, adjacent relation to a portion of such shaft to overlie the element supported from the shaft, and having a second portion at the distal end of said first portion which extends radially toward the axis of said plate, pivot means supported from said arm first portion upon an axis transverse with respect to the axis of said plate, a block supported from said pivot means for oscillation about the axis of said pivot means, yoke means projecting from said block and arranged, when said standard is so mounted, to straddle such a shaft for coactive association with such shiftable element, a pad on said block and projecting therefrom in angular relation to said yoke means, said arm first portion being formed with a threaded bore therethrough on an axis intersecting said pad, said arm second portion being formed with a threaded bore therethrough on an axis intersecting said yoke means, screw shaft means threadedly mountable in said bores to shift said block and yoke means, and means for securing said arm adjustably to said standard at any one of a plurality of peripherally spaced positions relative to said standard, comprising a plurality of identical securing stations peripherally spaced about said plate, and means engageable with said arm and with certain of said securing stations to fix said arm to said plate.

10. An actuator assembly for an element axially shiftably supported from a shaft, comprising a base, pivot means supported from said base, yoke means supported from said pivot means for oscillation about the axis of said pivot means, means for removably securing said base in position, with respect to such a shaft, with said pivot means axis transverse relative to the shaft axis and said yoke means operatively associated with the shiftable element, said base being formed with a bore on an axis transverse relative to the axis of said pivot means and, when said base is so secured, transverse relative to the shaft axis, and screw shaft means mounted in said bore and including means movable in the line of the axis of said bore, said last-named means being operatively associated with said yoke means to shift the latter in response to rotation of said screw shaft means.

References Cited in the file of this patent

UNITED STATES PATENTS

| | | |
|---|---|---|
| 1,662,654 | Abbott | Mar. 13, 1928 |
| 2,021,136 | Reeves | Nov. 19, 1935 |
| 2,224,369 | Reeves | Dec. 10, 1940 |
| 2,247,153 | Ewart | June 24, 1941 |
| 2,277,004 | Reeves | Mar. 17, 1942 |
| 2,297,936 | Ballman | Oct. 6, 1942 |
| 2,398,235 | Luenberger | Apr. 9, 1946 |
| 2,433,150 | Palm | Dec. 23, 1947 |
| 2,636,396 | Reeves | Apr. 28, 1953 |
| 2,720,186 | Springer | Oct. 11, 1955 |

FOREIGN PATENTS

| | | |
|---|---|---|
| 101,694 | Austria | Nov. 25, 1925 |